United States Patent [19]
Kondo

[11] Patent Number: 6,117,263
[45] Date of Patent: Sep. 12, 2000

[54] PRODUCT AND METHOD FOR EFFICIENTLY SPECIFYING COMPATIBILITY OF AN AFFIXED SHEET WITH THE SUPPORTING PRODUCT

[75] Inventor: Hirotaka Kondo, Isehara, Japan

[73] Assignee: Ricoh Company, Ltd., Tokyo, Japan

[21] Appl. No.: 09/070,721

[22] Filed: May 1, 1998

[30] Foreign Application Priority Data

| May 15, 1997 | [JP] | Japan | 9-125764 |
| Jul. 11, 1997 | [JP] | Japan | 9-186682 |
| Feb. 4, 1998 | [JP] | Japan | 10-023125 |

[51] Int. Cl.[7] .......................... B32B 31/00; B29B 17/00; C08J 11/04
[52] U.S. Cl. .................... 156/220; 156/277; 156/DIG. 1; 428/195; 428/903.3
[58] Field of Search ..................... 156/219, 277, 156/DIG. 1, 220; 428/195, 903.3, 914

[56] References Cited

U.S. PATENT DOCUMENTS

| 5,227,233 | 7/1993 | Itaba et al. . |
| 5,733,615 | 3/1998 | Goehner et al. . |
| 5,899,391 | 5/1999 | Goehner et al. . |

FOREIGN PATENT DOCUMENTS

| 8-34088 | 2/1996 | Japan . |
| 8-323337 | 12/1996 | Japan . |
| 2 315 488 | 2/1988 | United Kingdom . |

*Primary Examiner*—Curtis Mayes
*Attorney, Agent, or Firm*—Oblon, Spivak, McClelland, Maier & Neustadt, P.C.

[57] ABSTRACT

A plastic product that is capable of specifying the compatibility of an affixed sheet with the product, so as to eliminate a step of removing the affixed sheet during a recycling process of the plastic product includes at least one first seal that is made of plastic compatible with the plastic product and affixed on the plastic product and that indicates various arbitrary information and a second seal that is made of plastic compatible with the plastic product and affixed on the plastic product and that indicates the plastic product is able to be put through a material recycling process with the at least one first seal and the second seal affixed thereon.

19 Claims, 4 Drawing Sheets

FIG.2

>ABS<
NC118W

THE SEAL AFFIXED ON THE BASE ELEMENT HAS A COMPATIBILITY WITH THE BASE ELEMENT AND CAN BE RECYCLED TOGETHER WITHOUT BEING REMOVED FROM THE BASE ELEMENT.

FIG.3

>ABS<
NC118W

THREE SEALS AFFIXED ON THE BASE ELEMENT HAS A COMPATIBILITY WITH THE BASE ELEMENT AND CAN BE RECYCLED TOGETHER WITHOUT BEING REMOVED FROM THE BASE ELEMENT.

PRODUCT AND METHOD FOR EFFICIENTLY SPECIFYING COMPATIBILITY OF AN AFFIXED SHEET WITH THE SUPPORTING PRODUCT

BACKGROUND OF THE INVENTION

1. Field of the Invention

This invention relates to a product and method for specifying the compatibility of an affixed sheet with the product, and more particularly to a product and method for specifying the compatibility of an affixed sheet with the product in order to eliminate a step of removing the affixed sheet during a recycling process.

2. Discussion of the Background

In electronic equipment, such as a copying, facsimile or printing apparatus, for example, various kinds of informational plates are mounted, including plastic seals adhered on various parts of the equipment. One example of such a plastic seal is the notification sheet 30 illustrated in FIG. 6, which respectively indicates sales office information 30a and service office information 30b by which a user can order consumable items and repair services, for example.

Recently, when electronic equipment is scrapped, its plastic elements made of various resins including PS (polystyrene) resin, ABS (acrylonitrile butadiene styrene) resin, PPE (polyphenylene ether) and so forth are put through a material recycling process so that the plastic elements can be reused in different forms, for environmental reasons. Such plastic elements often have the above-mentioned seals thereon. When a plastic seal is adhered on a plastic element but they are not chemical compatible with each other, the two products must be processed separately in the recycling process in order to avoid the recycled plastics having different characteristics from the original plastics. Therefore, during the material recycling process, the plastic seals need to be removed from the plastic elements to which they are adhered.

In order to improve this material recycling process, a plastic seal that is compatible with the molded-plastic products has been developed. For example, Dainippon Ink and Chemicals, Inc. has developed a Dai-Hart that is compatible with the above-mentioned resins and is therefore popularly used for plastic seals.

Manufacturers of electronic equipment may draw the attention of those in the equipment scrapping and/or material recycling industry (recycling concerned workers) by indicating that the two plastic products, i.e., a plastic seal made of Dai-Hart and the molded-plastic product, are chemically compatible with each other. This may be done via the material compatibility information 30c of the plastic seal 30 of FIG. 6, which includes an exemplary phrase such as: "THIS SEAL HAS A COMPATIBILITY WITH THE BASE ELEMENT AND CAN BE RECYCLED TOGETHER WITHOUT BEING REMOVED FROM THE BASE ELEMENT," and an exemplary symbol "PS" representing polystyrene resin. Relying on such information, which is referred to as a "compatibility related note for recycling," recycling concerned workers will put the base element through the material recycling process together with the seal affixed thereon. In this way, the step of removing the seal from the base element can be eliminated and the scrapping and/or the material recycling process can be improved in its efficiency.

However the compatibility related note for recycling may not fit a small seal 30. Also, when a seal also includes notes related to operations, such as in the case of a control console for example, the note for recycling, which is unrelated to functional operations, may lead to an incorrect operation of the equipment. In addition, the note for recycling on the seal of a control console may be undesirable from an external design viewpoint.

SUMMARY OF THE INVENTION

Accordingly, an object of the present invention is to provide a novel plastic product that is capable of specifying an affixed sheet having compatibility with the plastic support product, so as to eliminate a step of removing the affixed sheet during a recycling process of the plastic product.

A plastic product includes a plastic support product and at least one first seal that is made of plastic compatible with the plastic support product and affixed on the plastic support product and that indicates various arbitrary information and a second seal that is made of plastic compatible with the plastic support product and affixed on the plastic support product and that indicates the plastic support product may be put through a material recycling process with the at least one first seal and the second seal affixed thereon.

Another object of the present invention is to provide a novel method for specifying the compatibility of an affixed sheet with the plastic support product on which it is affixed, so as to eliminate a step of removing the affixed seal during a recycling process of the plastic product, in which the method includes a first affixing step in which at least one first seal is affixed on the plastic support product, the at least one first seal being made of plastic compatible with the plastic support product and indicating various arbitrary information, and a second affixing step in which a second seal is affixed on the plastic support product, the second seal being made of plastic compatible with the plastic support product and indicating that the plastic product is able to be put through a material recycling process with the at least one first seal and the second seal affixed on the plastic support product.

Other objects, features, and advantages of the present invention will become apparent from the following detailed description when read in conjunction with the accompanying figures.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying figures, wherein:

FIG. 2 is an illustration of the seal of FIG. 1;

FIG. 3 is an illustration of another seal according to the present invention;

DESCRIPTION OF THE PREFERRED EMBODIMENTS

In describing preferred embodiments of the present invention illustrated in the figures, specific terminology is employed for the sake of clarity. However, the present invention is not intended to be limited to the specific terminology so selected and it is to be understood that each specific element includes all technical equivalents which operate in a similar manner.

Figure 1:
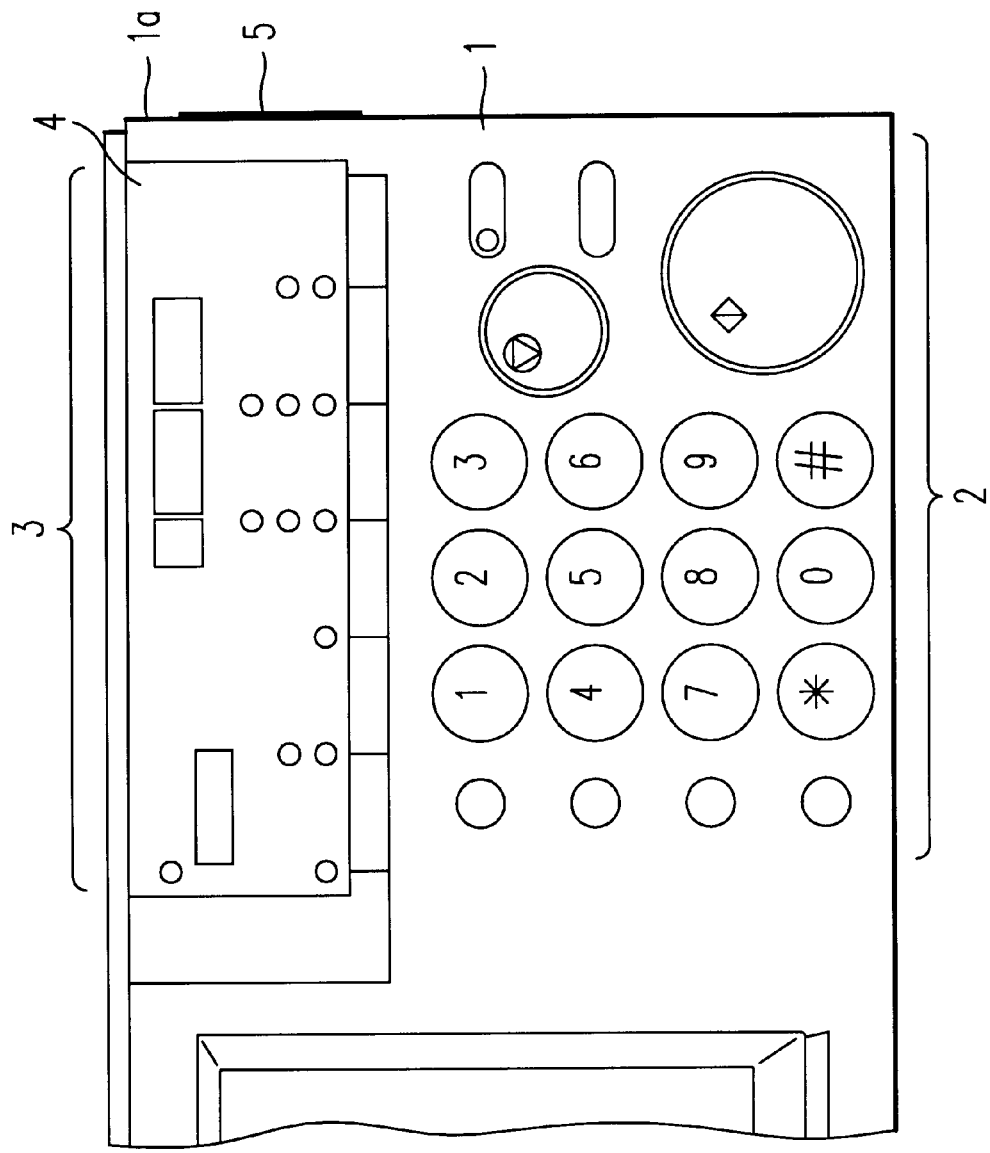
FIG. 1 is an illustration of a top view, in part, of a control console of a facsimile apparatus, including a seal according to the present invention.

Referring now to the figures, wherein like reference numerals designate identical or corresponding parts throughout the several views, and more particularly to FIG. 1 thereof, there is illustrated a top view, in part, of a control console 1 of a facsimile apparatus. The control console 1 of FIG. 1 is made of an ABS resin, for example. The control console 1 includes an operational portion 2 that has various buttons and keys thereon including a start button, a stop button, a ten-key pad and so forth, as illustrated in FIG. 1. The control console 1 further includes an indication portion 3 that includes a plurality of indicators for indicating various statuses and modes of operations. Adhered on the indication portion 3 is a seal 4 having alphanumeric characters and symbols printed thereon, representing various statuses and modes of operations corresponding to the above-mentioned indicators. This seal 4 is made of a plastic resin such as Dai-Hart manufactured by Dainippon Ink and Chemicals, Inc., for example, which is compatible with the material of the control console 1. By using such seals compatible with a plastic product on which the seals are adhered, the control console 1 can be handled together with the seals through the recycling processing without causing degradation in the characteristics of the resulting plastic.

On a side surface 1a of the control console 1 illustrated in FIG. 1, another similarly compatible seal 5 is adhered. The seal 5 indicates the type and grade of material that constitutes the element on which the seal 5 is affixed, as illustrated in FIG. 2. The seal 5 includes exemplary words and phrases to indicate the type and grade of a material of the control console 1. For example, "ABS" represents the material of the control console 1, "NC118W" represents the grade of the material, and the phrase "THE SEAL AFFIXED ON THE BASE ELEMENT HAS A COMPATIBILITY WITH THE BASE ELEMENT AND CAN BE RECYCLED TOGETHER WITHOUT BEING REMOVED FROM THE BASE ELEMENT," being positioned close to the characteristic indicia "ABS" and "NC118W," makes the recycling concerned workers notice this information.

The seal 5 eliminates the need for indicia of recycling to be affixed elsewhere on the control console 1, including the seal 4. In addition, the recycling concerned workers can efficiently and correctly perform a sorting of the elements during the recycling process by simply checking the seal 5.

Although FIG. 1 illustrates the case of the operational indication seal 4 affixed on the control console 1 of a facsimile apparatus, many other seals can be applied in a similar manner, including seals for taxable assets, explanations and/or instructions to users, and so forth. Moreover, it is not limited to seals of a facsimile apparatus but can also be applied to various other apparatuses including a copying apparatus, a printer, a scanner, and so on.

In addition, the recycling related phrase can be imprinted on a surface of the control console 1 close to the characteristic indicia instead of being printed on the seal. Preferably, the recycling related phrase is not affixed at a location on the side surface 1a of the control console 1 where users may see it, but at a location such as an inside surface of the control console 1 where users may not see it, but where it will draw the attention of recycling concerned workers.

Next, a seal 6 according to the present invention is explained with reference to FIG. 3. The seal 6 indicates type and grade of a material that constitutes the element on which the seal 6 is affixed in a similar manner to the seal 5, except for the recycling related phrase. The recycling related phrase of the seal 6 illustrated in FIG. 3 is "THREE SEALS PREVIOUSLY AFFIXED ON THE BASE ELEMENT HAS A COMPATIBILITY WITH THE BASE ELEMENT AND CAN BE RECYCLED TOGETHER WITHOUT BEING REMOVED FROM THE BASE ELEMENT." Thanks to the seal 6, recycling concerned workers can recognize that seals other than the three seals are affixed by the user, may have no compatibility with the element of the apparatus and must be removed when the apparatus is scrapped and/or put through the recycling process. In this case, if the three previously affixed seals are specified by any means, other seals affixed by users can easily be identified by the recycling concerned workers. Thus, the recycling concerned workers can perform the recycling process in an appropriate manner.

The recycling related phrase of FIG. 3 can be imprinted on a surface of the control console 1 close to the characteristic indicia, instead of being printed on the seal.

Next, a way of identifying which seals are incompatible with the affixed element of the apparatus is explained with reference to FIG. 4. The illustration of FIG. 4 is similar to that of FIG. 1 and therefore, in FIG. 4, the same reference numerals are provided to elements that correspond to the elements described with reference to FIG. 1 and the description of these elements is omitted.

Figure 4:
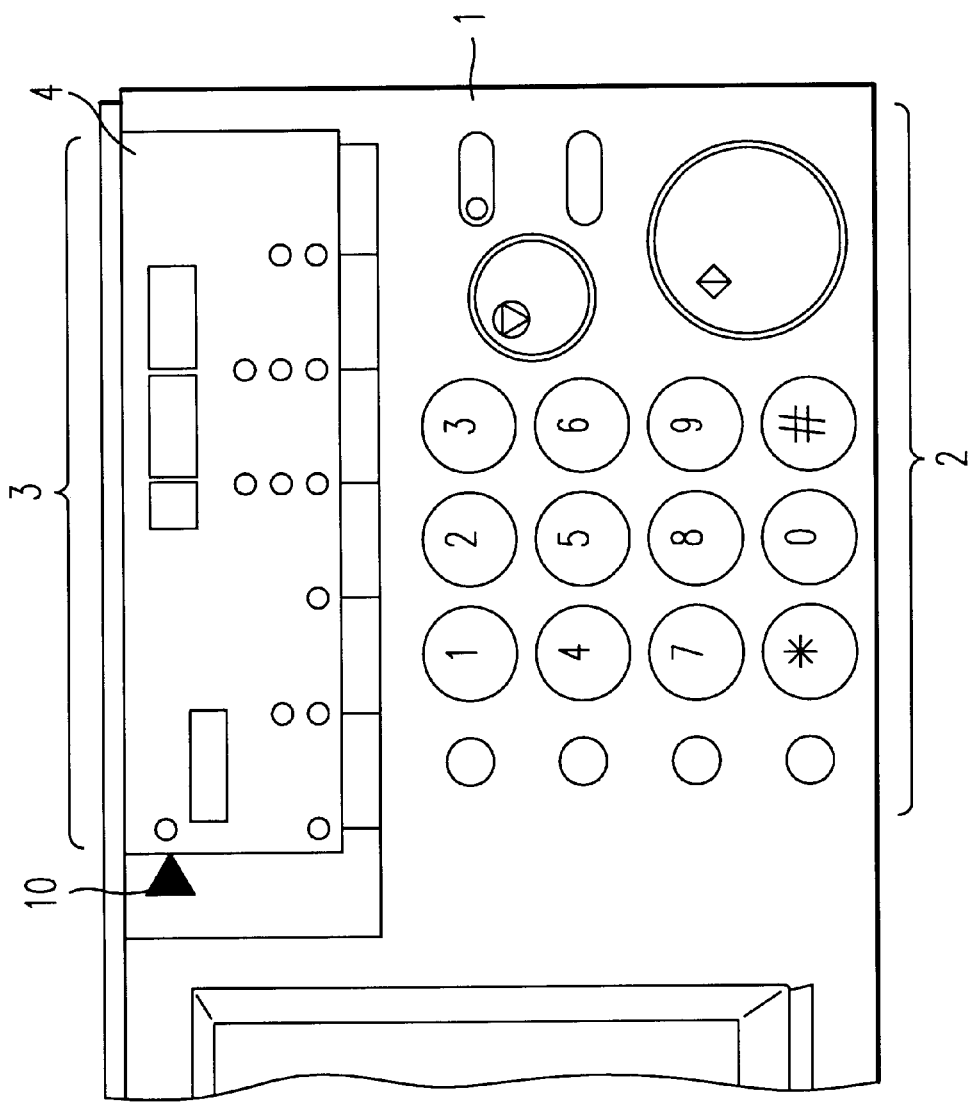
FIG. 4 is an illustration of another top view, in part, of the control console of the facsimile apparatus, including a mark according to the present invention.

In FIG. 4, the seal 4 which is compatible with the control console 1 is adhered in the indication portion 3 of the control console 1. On the indication portion 3, a triangle mark 10 is imprinted. The mark 10 indicates that seals affixed on the indication portion 3 of the control console 1 can be put through recycling processing together with the control console 1 without causing degradation in characteristics of the material of the control console 1. The recycling concerned workers who know the above-mentioned meaning of this mark 10 can perform the recycling process in an appropriate manner when recognizing the mark 10.

The mark 10 eliminates the need for a recycling related phrase on each of various seals that are affixed on the control console 1, including the above-mentioned seal 4. In addition, recycling concerned workers can efficiently and correctly sort the elements during the recycling process by simply checking the mark 10.

In addition, the mark 10 can identify seals affixed by the manufacturer and that are incompatible with the material of the element, and distinguishes them from the seals affixed in an area other than the indication portion 3 by the user. Recycling concerned workers who know the above-mentioned meaning of this mark 10 are able to determine the seals to be removed in the recycling process when recognizing the mark 10.

The mark 10 may be an arbitrary printed mark, such as a symbol, a pattern, and so forth, to be printed on a compatible seal to be affixed at an appropriate position on the control console 1, where the seal 4, for example, is attached. Alternatively, the mark 10 may be an imprinting or an engraving on the surface of the control console 1.

Preferably, the mark 10 is not placed at a location on the side surface 1a of the control console 1 where users may see, but at a location such as an inside surface of the control console 1 where users may not see but which would draw the attention of recycling concerned workers.

Figure 5:
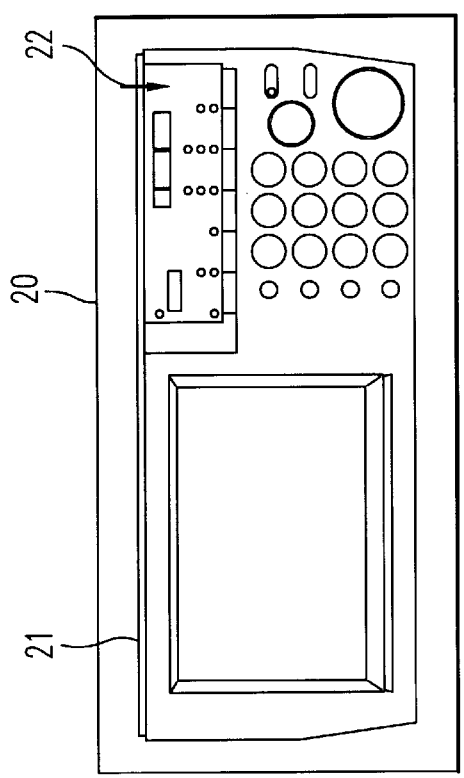
FIG. 5 is an illustration of still another seal having an image of the control console and a mark.
Figure 6:
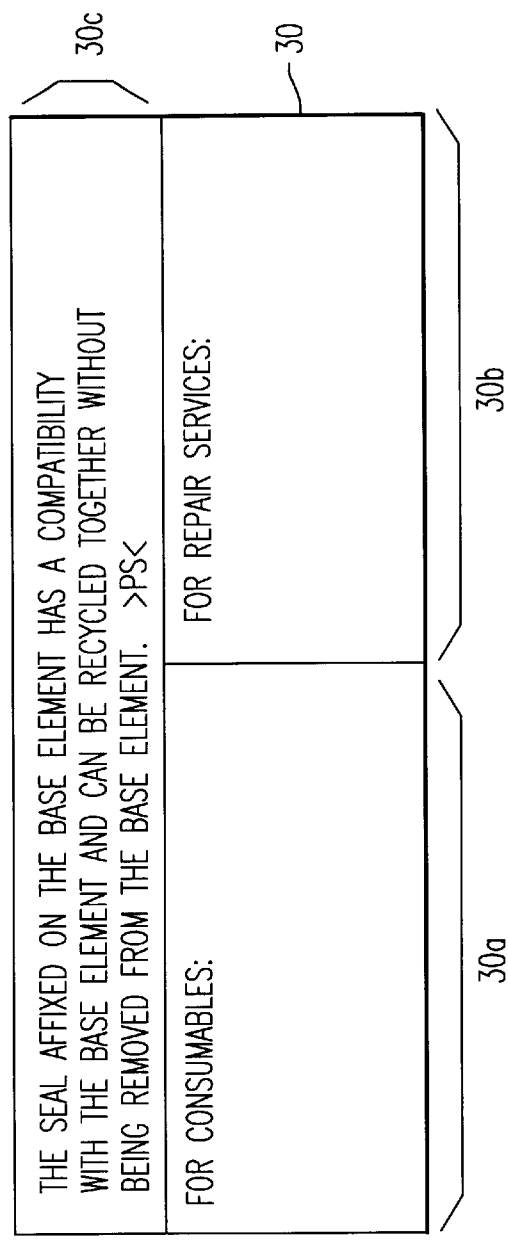
FIG. 6 is an illustration of a conventional seal.

Next, another way of identifying which seals are incompatible with the supporting element of the apparatus is explained with reference to FIG. 5. The illustration of FIG. 5 corresponds to that of FIG. 1. FIG. 5 illustrates a display seal 20 that is made of a resin compatible with the material of the control console 1. The display seal 20 of FIG. 5 has an image 21 that represents the control console 1 and an arrow 22 that indicates the compatible resin seal 4 in the indication position 3 of the control console 1 in the image 21. The thus-printed display seal 20 is affixed at a location such as an inside surface of the control console 1 where users may not see but which will draw the attention of recycling concerned workers.

The thus-arranged display seal 20 eliminates the need for the recycling related phrase on each of various seals that are affixed on the control console 1, including the above-mentioned seal 4. In addition, recycling concerned workers can efficiently and correctly sort the elements during the recycling process by simply checking the above-mentioned display seal 20.

Each of the image 21 and the arrow 22 of the display seal 20 may be formed of arbitrary marks, including lines, symbols, patterns, and so forth, to be printed on a same compatible seal to be affixed at an appropriate position on the control console 1. Alternatively, the image 21 and the arrow 22 may be imprinting or engravings on the surface of the control console 1.

Preferably, the display seal 20 or its contents is not placed at a location on the side surface 1a of the control console 1 where users may see it, but at a location such as an inside surface of the control console 1 where users may not see it, but which will draw an attention of the recycling concerned workers.

Although the above-mentioned case is the control console of the apparatus, the technique described above is not limited to this element but can be applied to various elements of the apparatus other than the control console.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent applications which are given the numbers of JPAP09-125764, JPAP09-186682, and JPAP10-023125 as filed in the Japanese Patent Office on May 15, 1997, Jul. 11, 1997, and Feb. 4, 1998, respectively. The entire contents of these applications are hereby incorporated by reference.

What is claimed as new and is desired to be secured by Letters Patent of the United States is:

1. A method of specifying a seal that is affixed on a plastic product and that has a compatibility with the plastic product, comprising the steps of:

affixing at least one first seal on said plastic product, said at least one first seal being made of plastic compatible with said plastic product and indicating certain information; and providing a mark distinct from said at least one first seal to said plastic product, said mark being previously defined as indicating that said plastic product is able to be put through a material recycling process with said at least one first seal affixed thereon, wherein said providing step imprints a mark on a surface of said plastic product.

2. A method of specifying a seal that is affixed on a plastic product and that has a compatibility with the plastic product, comprising the steps of:

affixing at least one first seal on said plastic product, said at least one first seal being made of plastic compatible with said plastic product and indicating certain information; and providing a mark distinct from said at least one first seal to said plastic product, said mark being previously defined as indicating that said plastic product is able to be put through a material recycling process with said at least one first seal affixed thereon, wherein said providing step engraves a mark on a surface of said plastic product.

3. A method of specifying a seal that is affixed on a plastic product and that has a compatibility with the plastic product, comprising the steps of:

affixing at least one first seal on said plastic product, said at least one first seal being made of plastic compatible with said plastic product and indicating certain information; and providing a mark to said plastic product near said at least one first seal and distinct from said at least one first seal, said mark being previously defined as indicating that said plastic product is able to be put through a material recycling process with said at least one first seal affixed thereon, wherein said providing step imprints a mark on a surface of said plastic product.

4. The method according to claim 3, wherein said providing step provides a mark to at least one of rear and inside surfaces of said plastic product.

5. A method of specifying a seal that is affixed on a plastic product and that has a compatibility with the plastic product, comprising the steps of:

affixing at least one first seal on said plastic product, said at least one first seal being made of plastic compatible with said plastic product and indicating certain information; and providing a mark to said plastic product near said at least one first seal and distinct from said at least one first seal, said mark being previously defined as indicating that said plastic product is able to be put through a material recycling process with said at least one first seal affixed thereon, wherein said providing step engraved a mark on a surface of said plastic product.

6. The method according to claim 5, wherein said providing step provides a mark to at least one of rear and inside surfaces of said plastic product.

7. A method of specifying a seal that is affixed on a plastic product and that has a compatibility with the plastic product, comprising the steps of:

a first affixing step of affixing at least one first seal on said plastic product, said at least one first seal being made of plastic compatible with said plastic product and indicating certain information;

a first providing step of providing an image to at least one of rear and inside surfaces of said plastic product, said image representing a configuration of said plastic product; and a second providing step of providing a mark distinct from said at least one first seal to at least one of rear and inside surfaces of said plastic product, said mark being previously defined as indicating that said plastic product is able to be put through a material recycling process with said at least one first seal affixed thereon and pointing out said at least one first seal in said image, wherein said first and second providing steps imprint said image and said mark on a surface of at least one of rear and inside surfaces of said plastic product.

8. A method of specifying a seal that is affixed on a plastic product and that has a compatibility with the plastic product, comprising the steps of:

a first affixing step of affixing at least one first seal on said plastic product, said at least one first seal being made of plastic compatible with said plastic product and indicating certain information;

a first providing step of providing an image to at least one of rear and inside surfaces of said plastic product, said image representing a configuration of said plastic product; and a second providing step of providing a mark distinct from said at least one first seal to at least one of rear and inside surfaces of said plastic product, said mark being previously defined as indicating that said plastic product is able to be put through a material recycling process with said at least one first seal affixed thereon and pointing out said at least one first seal in said image, wherein said first and second providing steps engrave said image and said mark on a surface of at least one of rear and inside surfaces of said plastic product.

9. A plastic product, comprising:

a plastic supporting product;

at least one first seal that is made of plastic compatible with said plastic supporting product and affixed on said plastic supporting product and that indicates certain information; and a mark distinct from said at least one first seal and provided to said plastic supporting product, the mark being previously defined as indicating that said plastic product is able to be put through a material recycling process with said at least one first seal affixed thereon, wherein said mark is imprinted on a surface of said plastic supporting product.

10. A plastic product, comprising:

a plastic supporting product;

at least one first seal that is made of plastic compatible with said plastic supporting product and affixed on said plastic supporting product and that indicates certain information; and a mark distinct from said at least one first seal and provided to said plastic supporting product, the mark being previously defined as indicating that said plastic product is able to be put through a material recycling process with said at least one first seal affixed thereon, wherein said mark is engraved on a surface of said plastic supporting product.

11. A plastic product, comprising:

a plastic supporting product;

at least one first seal that is made of plastic compatible with said plastic supporting product and affixed on said plastic supporting product and that indicates certain information; and a mark distinct from said at least one first seal and that is provided to said plastic supporting product near said at least one first seal and that is previously defined as indicating that said plastic product is able to be put through a material recycling process with said at least one first seal affixed thereon, wherein said mark is imprinted on a surface of said plastic supporting product.

12. The plastic product according to claim 11, wherein said mark is provided to at least one of rear and inside surfaces of said plastic supporting product.

13. A plastic product, comprising:

a plastic supporting product;

at least one first seal that is made of plastic compatible with said plastic supporting product and affixed on said plastic supporting product and that indicates certain information; and a mark distinct from said at least one first seal and that is provided to said plastic supporting product near said at least one first seal and that is previously defined as indicating that said plastic product is able to be put through a material recycling process with said at least one first seal affixed thereon, wherein said mark is engraved on a surface of said plastic supporting product.

14. The plastic product according to claim 13, wherein said mark is provided to at least one of rear and inside surfaces of said plastic supporting product.

15. A plastic product, comprising:

a plastic supporting product;

at least one first seal that is made of plastic compatible with said plastic supporting product and affixed on said plastic supporting product, said at least one first seal indicating certain information;

an image that is provided to at least one of rear and inside surfaces of said plastic supporting product and that represents a configuration of said plastic supporting product;

a mark distinct from said at least one first seal and that is provided to at least one of rear and inside surfaces of said plastic product, that is previously defined as indicating that said plastic product is able to be put through a material recycling process with said at least one first seal affixed thereon, and that points out said at least one first seal in said image; and a second seal on which said image and said mark are indicated, said second seal being made of plastic compatible with said plastic supporting product and affixed on at least one of rear and inside surfaces of said plastic supporting product.

16. A plastic product, comprising:

a plastic supporting product;

at least one first seal that is made of plastic compatible with said plastic supporting product and affixed on said plastic supporting product, said at least one first seal indicating certain information;

an image that is provided to at least one of rear and inside surfaces of said plastic supporting product and that represents a configuration of said plastic supporting product; and a mark distinct from said at least one first seal and that is provided to at least one of rear and inside surfaces of said plastic product, that is previously defined as indicating that said plastic product is able to be put through a material recycling process with said at least one first seal affixed thereon, and that points out said at least one first seal in said image, wherein said image and said mark are imprinted on a surface of at least one of rear and inside surfaces of said plastic supporting product.

17. A plastic product, comprising:

a plastic supporting product;

at least one first seal that is made of plastic compatible with said plastic supporting product and affixed on said plastic supporting product, said at least one first seal indicating certain information;

an image that is provided to at least one of rear and inside surfaces of said plastic supporting product and that represents a configuration of said plastic supporting product; and a mark distinct from said at least one first seal and that is provided to at least one of rear and inside surfaces of said plastic product, that is previously defined as indicating that said plastic product is able to be put through a material recycling process with said at least one first seal affixed thereon, and that points out said at least one first seal in said image, wherein said image and said mark are engraved on a surface of at least one of rear and inside surfaces of said plastic supporting product.

18. A plastic product, comprising:

a plastic supporting product;

at least one seal that is made of plastic compatible with said plastic supporting product and affixed on said plastic supporting product and that indicates certain information; and indicating means distinct from said at least one seal for indicating said plastic supporting product is able to be put through a material recycling process with said at least one seal affixed thereon, wherein said indicating means is a mark and imprinted on a surface of said plastic supporting product.

19. A plastic product, comprising:

a plastic supporting product;

at least one seal that is made of plastic compatible with said plastic supporting product and affixed on said plastic supporting product and that indicates certain information; and indicating means distinct from said at least one seal for indicating said plastic supporting product is able to be put through a material recycling process with said at least one seal affixed thereon, wherein said indicating means is a mark and engraved on a surface of said plastic supporting product.

* * * * *